Jan. 13, 1925.

H. H. DAVIS

TIRE RIM TOOL

Filed Aug. 3, 1923

1,522,501

2 Sheets-Sheet 1

Inventor
Howe H. Davis;
By Robert W. Randle,
Attorney.

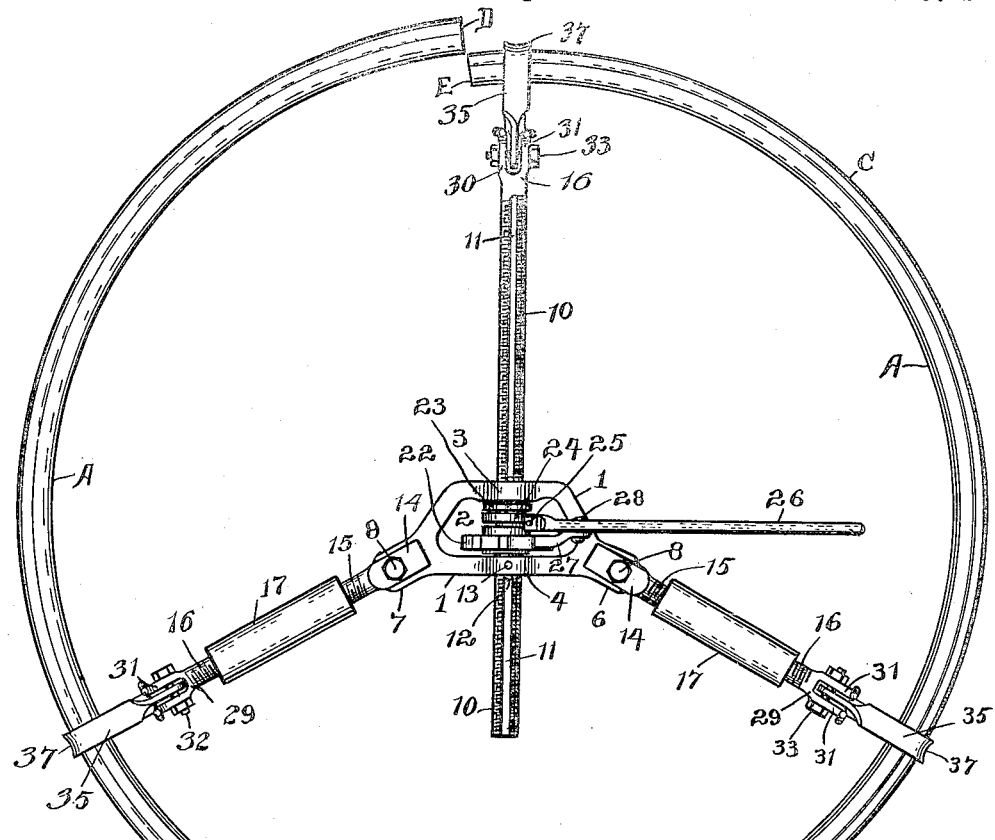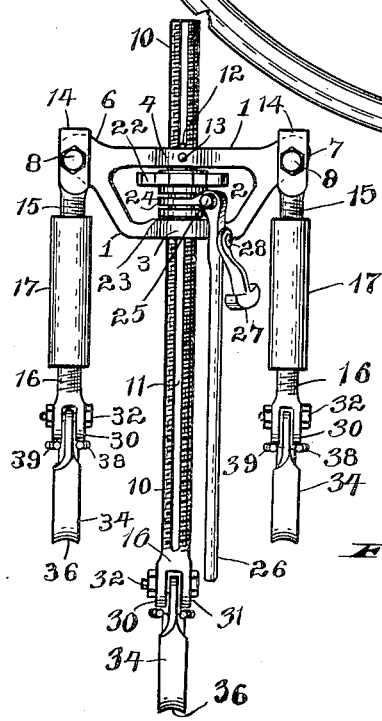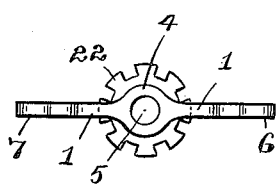

Patented Jan. 13, 1925.

1,522,501

UNITED STATES PATENT OFFICE.

HOWE H. DAVIS, OF RICHMOND, INDIANA.

TIRE-RIM TOOL.

Application filed August 3, 1923. Serial No. 655,450.

*To all whom it may concern:*

Be it known that I, HOWE H. DAVIS, a citizen of the United States, residing in the city of Richmond, in the county of Wayne, State of Indiana, have invented a new and useful Tire-Rim Tool, of which the following is a full, clear, and comprehensive specification, being such as will enable others to construct and use the same with exactitude.

The object of my present invention, broadly speaking, is the provision of a tire rim tool which is strong and durable in construction, simple in its several parts, easily operated in practice, comparatively light in weight, compact in form, and which can be manufactured and sold at a comparatively low price.

More specifically stated my object is to provide a tire rim tool by which a tire rim may be contracted to remove it from a tire or casing and by which the rim may easily be expanded to its normal operative position in connection with a tire, and whereby both operations may be performed without twisting the rim and without damage thereto, and requiring only a minimum of time and labor on the part of the operator in the manipulation thereof.

Other objects and particular advantages of the invention will be brought out and made apparent to the ordinary mechanician in the course of the following specification.

The preferred means for carrying out the principles of my invention in a practical manner is shown in the accompanying two sheets of drawings, in which—

Figure 1:
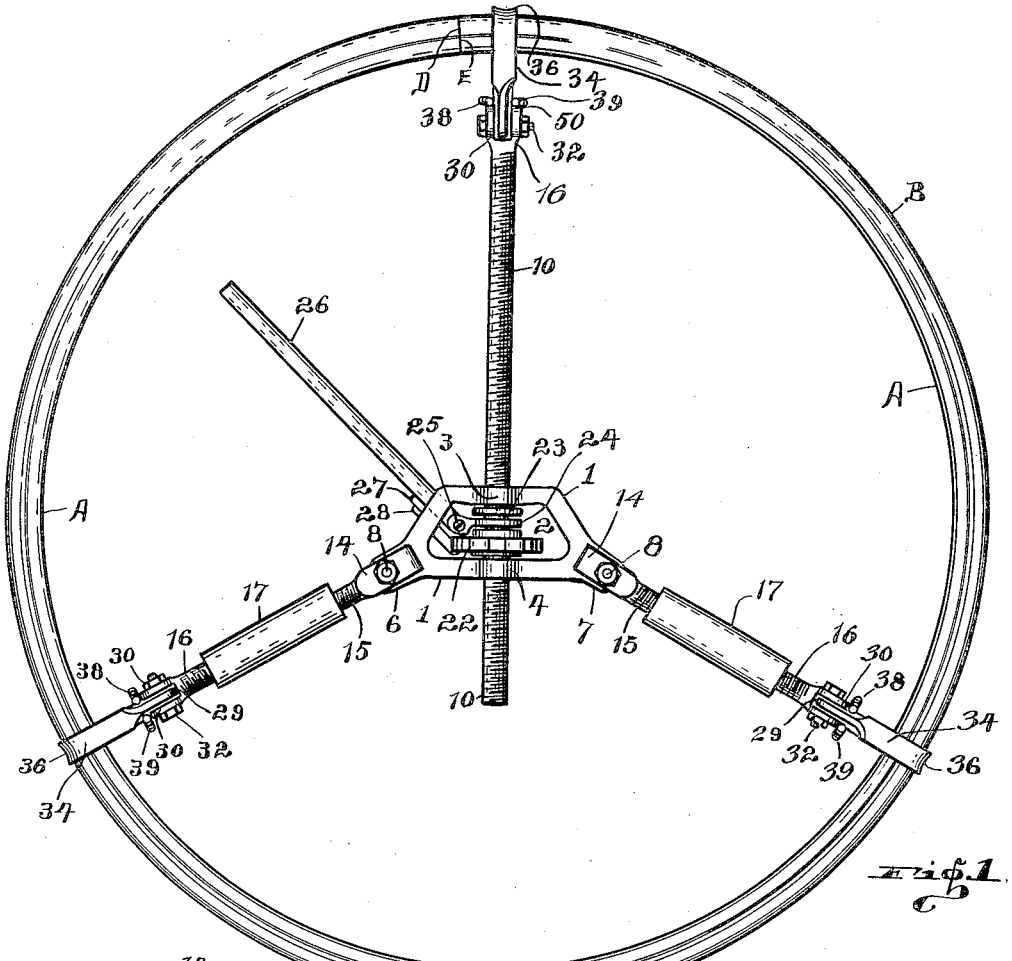
Figure 5:
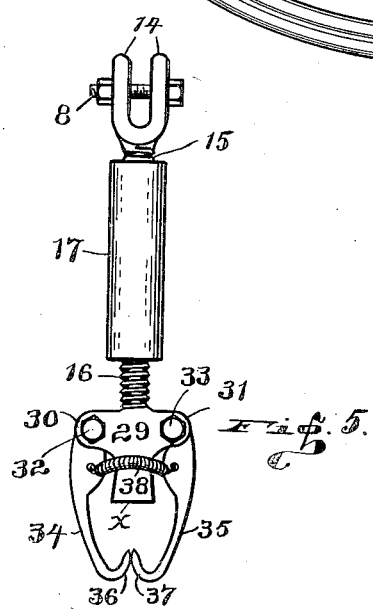
Figure 6:
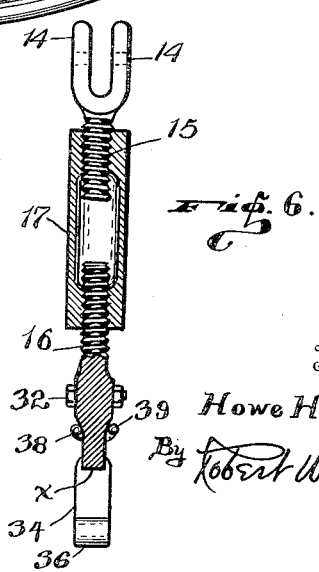

Figure 1 shows my invention extended in operative condition in connection with a tire-rim, showing it in position to commence contracting the rim or as having completed the operation of pushing the rim out to its normal operative position. Figure 2 is the same as Fig. 1, except that it shows the other side of the device and showing the rim as partly contracted by the device. Figure 3 shows the device in folded position, as it would appear when not in use. Figure 4 is a plan view of the ratchet wheel, also showing an end elevation of the body member. Figure 5 shows one of the arms in elevation and showing a side elevation of the jaws carried thereby, and Figure 6 shows a longitudinal central section of one of the arms, and also an edge view of one of the jaws.

Similar indices denote like parts throughout the several views.

In order that the construction, the operation, and the several advantages of the invention may be more fully understood and appreciated I will now take up a detailed description thereof, in which I will describe the several parts as fully as I may.

In the drawings letter A denotes a tire-rim, having the usual marginal edges or flanges B and C, and the ends D and E. Said ends being abutted together when the tire is in operative condition to retain a tire casing extending therearound in contact with the periphery of the rim, with its edges located between the edges or flanges B and C of the rim.

Locking means (not shown) are provided to retain said ends in registering contact with each other.

After a tire has been used for some time in connection with its rim it becomes set or sealed thereto, and for that reason, and also by reason of the expansive tendency of the rim, it becomes very difficult to remove the rim from the tire, but by the employment of my tool this difficulty is overcome, thereby making it very easy both to remove and replace the rim.

The invention proper comprises a frame or body member 1, having a central space 2 therethrough as shown. Said body member has two swelled or rounded portions 3 and 4, which are spaced apart as shown and through which smooth-bore apertures are formed, as the aperture 5 shown in Fig. 4. Said apertures are in direct alinement with each other but they are spaced apart by the space 2.

Extending out at an angle from the wider portion of the body 1 are oppositely disposed tongues 6 and 7, each having an aperture therethrough to receive the respective bolts 8 and 9.

In this instance there is one active and two passive arms.

The active arm includes the screw-shaft 10, which is of such diameter as to slide snugly through the apertures 5 in the swell portions 3 and 4. A channel 11 extends the full length of the threaded portion of the shaft 10 and it is longitudinally thereof. A key 12 is located in the channel 11 and in the aperture 5, and it is secured in the latter by the pin or screw 13, whereby the shaft 10 may move longitudinally but can not turn.

The passive arms are identical with each other, and they are shown in Figs. 5 and 6. Each of said arms comprises a clevis 14 adapted to stride the tongues 6 and 7 where it is pivotedly secured by the bolt 8. A threaded stem 15 extends from the clevis 14 being integral therewith. A second threaded stem 16 is spaced from and is in alinement with the stem 15. The stems 15 and 16 are connected by the turnbuckle 17 whereby when the turnbuckle 17 is turned in one direction said stems will be drawn toward each other, while if turned in the other direction they will be forced apart.

The ratchet mechanism comprises the ratchet-wheel 22, having a hub-flange 23 integral therewith. The thickness of the wheel 22 plus the length of the hub 23 is such as to extend between the inner ends of the portions 3 and 4, which of course brings them in the space 2 as shown in Figs. 1, 2 and 3.

The central aperture through said wheel 22 and hub 23 is threaded to run on the threads of the shaft 10, whereby the turning of the wheel 22 will move the shaft 10 endwise.

A collar 24 surrounds the hub 23, the same being rotatably mounted in a channel formed around in the periphery of said hub, as is indicated. The ends of said collar are connected by a bolt 25 to the inner end of the lever 26 whereby said lever is pivoted on the bolt 25. By the above it will be seen that the lever 26 has universal movements: turning on the bolt 25; and by the turning of the collar 24 around said hub.

Numeral 27 denotes a double-tooth pawl, which is pivoted by the bolt 28 to the lever 26 in such manner that the teeth of the pawl may engage in the notches formed in the periphery of the wheel 22.

*Jaw-heads.*—Formed integral with the outer end of each of the stems 16 is a head 29 whose outer face $x$ is at right-angles to the stem 16. Integral with and extending out from two opposite sides of the head 29 is a pair of ears, 30 and 31, which are formed with apertures therethrough to receive the respective bolts 32 and 33. Numerals 34 and 35 denote identical but oppositely disposed hook jaws, whose base ends are located between the members of the respective pairs of ears 30 and 31, and they are pivoted on the respective bolts 32 and 33. The outer portions of said jaws terminate in the respective hooks 36 and 37. Said jaws are normally and resiliently drawn inward toward each other by a pair of helical springs 38 and 39. At the end of the shaft 10 are placed gripping jaws and a head corresponding in all respects to those at the end of each stem 16.

*Modus operandi.*—The operation of my invention is very simple, for instance, when the device is in the position in which it is shown in Fig. 3 it may be carried in one's tool-box, or it may be transported at very slight expense. Desiring now to use the tool one has only to lay the rim A with its tire connected thereto upon a floor. The tool may then be opened out, disposing the arms at approximately equal distances apart and radiating from the body member 1.

By turning the turnbuckles 17, and the ratchet wheel 22, the arms may be lengthened to suit the diameter of that particular rim. However after this adjustment is once made it will not be necessary to change it unless one desires to operate upon a different size rim than that to which it is adjusted.

Next the jaws 34 and 35 may be manually opened, then engaging the hooks of the jaws with the flanges B and C of the rim A where they will be retained by their respective springs. Now one has only to grasp the lever 26, turning it to the position in which it is shown in Fig. 2, that is so that it will extend out at right-angles to the shaft 10. The pawl 27 is then turned to the left whereby when the lever 26 is moved to the right the pawl will engage and turn the wheel 22 to the right, thereby drawing the shaft 10 inward, that is away from the rim. As the jaws carried by the shaft 10 are near the end E, and as the jaws of the other two arms are also engaged with the rim, it is evident that as the shaft 10 is moved inward the end portion E of the rim will first be drawn inward, as in Fig. 2, until it is disengaged from the end D, and thereby permitted to pass or lap under the portion D, thereby decreasing the circumference of the rim with relation to the tire, and thereby freeing the tire from the rim.

Then after the tire has been repaired, or a new tire substituted therefor, it may be placed in position around the rim, still being held contracted by my tool, after which the pawl may be turned over whereby when the lever 26 is operated the wheel 22 will be turned to the left, thereby forcing the shaft 10 outward, with the faces $x$ of the heads, against the inner periphery of the rim, which manifestly will force the rim back to its normal operative position in engagement with the tire, as shown in Fig. 1.

From the above it will be apparent that the pull upon each side of the rim will always be equal and the rim can not be twisted out of shape in the operation.

I desire that it be understood that various changes may be made in the several details of the arrangement herein shown without departing from the principles of the invention and without sacrificing any of the advantages thereof which are new and useful.

Having now fully shown and described my invention, what I claim and desire to secure by Letters Patent of the United States, is—

1. A tire rim tool comprising a central body member, a screw shaft extending through the body and adapted to be moved endwise but not revolubly, a ratchet wheel located in the body member and operative upon said shaft to force it endwise, a universally mounted lever for operating said ratchet wheel, a pawl pivoted to said lever and adapted to be turned to drive the ratchet wheel in either direction, a pair of arms pivoted to the body member, means for adjusting the lengths of said arms, a pair of jaws carried by the outer end of each arm and the outer end of said shaft and adapted to engage both edges of a tire rim, and means for resiliently drawing the members of each pair of jaws toward each other into engagement with the edges of the tire rim.

2. A tire tool comprising a central body member, a screw shaft extending through the body member and adapted to be moved endwise therein, means for preventing said shaft from turning in the body member, a ratchet wheel located in an opening in the body member and threaded upon said shaft, a universally mounted lever for operating said ratchet wheel, a pawl pivoted to said lever and adapted to be turned to drive the ratchet wheel in either direction, a pair of arms pivoted to the body member, turnbuckles for adjusting the lengths of said arms, a pair of jaws carried by the outer end of each of said arms, a third pair of jaws carried by the outer end of said shaft, springs for manually drawing the members of each pair of jaws toward each other, and a head located between the members of each pair of jaws to engage the inner periphery of a tire rim whereby the rim may be forced outward by means of said head as well as drawn inward by means of said jaws.

In testimony whereof I have hereunto subscribed my name.

HOWE H. DAVIS.